(12) United States Patent
Horst et al.

(10) Patent No.: US 6,456,674 B1
(45) Date of Patent: Sep. 24, 2002

(54) METHOD AND APPARATUS FOR AUTOMATIC REPETITION RATE ASSIGNMENT IN A REMOTE CONTROL SYSTEM

(75) Inventors: Folkert Horst, Pierrefonds; Andre Brousseau, Salaberry N. Chateauguay; Oleh Szklar, St. Hubert; Luc Ethier, St. Eustache, all of (CA)

(73) Assignee: Canac Inc., St. Laurent (CA)

( * ) Notice: Subject to any disclaimer, the term of this patent is extended or adjusted under 35 U.S.C. 154(b) by 0 days.

(21) Appl. No.: 09/162,170

(22) Filed: Sep. 28, 1998

(30) Foreign Application Priority Data

Sep. 25, 1998 (CA) .............................................. 2248526

(51) Int. Cl.⁷ ................................................ H04L 1/02
(52) U.S. Cl. ...................... 375/347; 375/259; 375/295; 375/316; 370/60; 246/187 A
(58) Field of Search ................................ 375/347, 259, 375/295, 316; 370/60; 340/825.64, 825.62, 825.58; 455/70; 246/187, 187 B, 187 A

(56) References Cited

U.S. PATENT DOCUMENTS

| | | | |
|---|---|---|---|
| 3,582,783 A | * 6/1971 | Hendrickson | .......... 340/825.58 |
| 4,245,347 A | 1/1981 | Hutton et al. | .................. 455/70 |
| 4,931,790 A | * 6/1990 | Kobayashi et al. | .... 340/825.64 |
| 5,400,329 A | * 3/1995 | Tokura et al. | ................. 370/60 |
| 5,685,507 A | * 11/1997 | Horst et al. | .................. 246/187 |

* cited by examiner

Primary Examiner—Stephen Chin
Assistant Examiner—Shuwang Liu
(74) Attorney, Agent, or Firm—Ladas & Parry

(57) ABSTRACT

The invention relates to a method and an apparatus for remotely controlling devices, more particularly to a system and method for controlling locomotives in a railway environment using radio frequency signals. This invention makes use of equalized pseudo-random transmission intervals obtained using a random number generator to regulate the times at which the signals are sent from a transmitter to a receiver. The use of these randomly generated transmission intervals allows eliminating the requirement of having an operator manage these intervals for transmitters in simultaneous operation. The invention also provides communication systems operating concurrently with substantially uniform response times by constraining the values of the transmission intervals to lie within a given range.

31 Claims, 3 Drawing Sheets

METHOD AND APPARATUS FOR AUTOMATIC REPETITION RATE ASSIGNMENT IN A REMOTE CONTROL SYSTEM

FIELD OF THE INVENTION

This invention relates to the field of communication and control systems. It is particularly applicable to methods and apparatus for transmitting data and control information over transmission channels with multiple users.

BACKGROUND OF THE INVENTION

Microprocessors are commonly used in control systems to regulate a wide variety of systems from the simple hand held calculator to large mechanical systems such as valves and vehicles. In a specific example, microprocessors are used to control vehicles such as locomotives in order to perform functions including braking, traction control and acceleration. Radio frequency transmitter-receiver pairs are of particular interest for remotely controlling such vehicles.

In a typical locomotive control system, the operator communicates with a microprocessor-based controller onboard the locomotive using a remote control device, herein designated as transmitter. In a specific example, the transmitter is a portable device capable of emitting control signals. The operator enters requests into the transmitter via any suitable input such as a keyboard, touch screen or any other suitable system. Typical requests may include brake, accelerate and any function that a locomotive may be capable of performing. The transmitter encodes the request into a form suitable for transmission over a pre-determined frequency link. Usually, a tag is added on to the request to indicate the locomotive for which the request is destined as well as an identifier defining the remote control device from which the request originates. The complete request is then modulated at the pre-determined radio frequency and transmitted as a RF signal. Frequencies other than RF can also be used for this purpose.

Optionally, once the transmitter sends the RF signal, a repeater unit may receive the RF signal. Typical repeater units are ground-based units whose function is to extend the radio frequency (RF) range of the transmitter of the remote control device by amplifying the signal and filtering noise components. Repeater units are well-known in the art to which this invention pertains and typically comprise an RF antenna, an RF receiver, a decoder/encoder, an RF re-transmitter and any other equipment such as filters, duplexors and others required to receive a signal, process it and retransmit it. Commonly, the repeater unit re-transmits the signal at a frequency different from the frequency used by the transmitter as well as sufficiently spaced in frequency from the frequency used by the transmitter such that the two signals can be resolved if they are received simultaneously by a receiver unit.

A receiver aboard the locomotive has a decoder module that receives and demodulates the RF signal originating from the transmitter or from the repeater unit. The signal is then decoded and the validity of the request is verified. Typically, verifying the validity of a request involves performing a sequence of operations to verify if tho transmitter from which the request originates is permitted to issue requests to the particular locomotive as well as verifying if the signal received is intact. Generally, a computer readable medium in the receiver stores an identifier indicative of the transmitter assigned to the locomotive. The identifier is compared to the tag contained in the received demodulated request. Another operation in the verification of the signal involves verifying if the signal is intact by using a check sum or other suitable error detection or correction algorithm. Verifying that a message is intact is well known in the art of signal processing. If the signal is valid it is then processed further so the command contained in the request can be implemented.

Locomotive control systems of the type described above operate in railroad environments concurrently with many other similar locomotive control devices including transmitters and receivers. Commonly, many transmitters operate on the same radio frequency channel or on overlapping radio frequency channels often resulting in interference between the various signals. Signals transmitted in overlapping frequency channels cannot be resolved into their respective signals by the receiver module solely on the basis of frequency filtering. The interference of the signals typically causes commands to be lost.

A common solution to this problem is to transmit a command continuously at a given rate and where each transmitter is being assigned a unique repetition rate. The unique repetition rate reduces the likelihood of messages interfering with one another. A variant on this method is described in detail in U.S. Pat. No. 4,245,347 by Hutton et al. whose content is hereby incorporated by reference. In order to work adequately, the repetition rate of each transmitter must lie between a certain upper threshold, in order to prevent a single transmitter from monopolising the airways, and above a certain lower threshold in order to avoid a system receiving insufficient information. Furthermore, the repetition rates assigned to each transmitter must leave a time window that is sufficiently long to allow a complete message to be transmitted from a transmitter with no interference from other transmitter units operating at the same frequency. Finally, for systems requiring a high level of confidence such as systems that may create a potential safety hazard when a remotely transmitted command is not received properly or not received at all, the receiver stations are designed to expect a control message periodically from the transmitter. If the control message is not received within a pre-determined time period, the system assumes there is a problem and proceeds in executing an emergency default action. In order to assign a repetition rate to a set of transmitters, the above constraints must be taken into account. Consequently, the assignment and management of repetition rates by an administrator is a time consuming task resulting in significant labour costs. Also, the reliance on an administrator to assign transmission rate makes the system highly susceptible to human errors. For example, an administrator may erroneously give two transmission units the same repetition rate resulting in conflicting signals.

An additional problem with systems of the type described above is that the response time of a transmitter/receiver pair is substantially affected by the assigned repetition rate. Consider a system where two transmitter units are operating simultaneously and where the first unit has a repetition rate of 0.5/second and repeats its messages every 2 seconds and where the second unit has a repetition rate of 0.33/second and repeats its messages every 3 seconds. In the worst case scenario, every second message of the second transmitter will interfere with every third message of the first transmitter, the average response time for the receiver associated to the second transmitter will be 6 seconds and the average response time for the receiver associated to the first transmitter will be 3 seconds. Therefore, for identical transmitter/receiver pairs operating at different repetition rates, the response time of a transmitter/receiver may be substantially longer than that of another unit. This often leads to frustration for tho operator of the system who does not see a uniform delay in the response from one unit in the system to the next. Additionally, the battery life of system transmitting every 2 seconds will be distinctly shorter than that of the system transmitting every 3 seconds since the battery will have to supply power more frequently to the transmission device.

Thus, there exists a need in the industry to refine the process of signal transmission in the context of a transmitter/ receiver pair.

OBJECTS AND STATEMENT OF THE INVENTION

An object of the invention is to provide an improved method and apparatus for signal transmission.

As embodied and broadly described herein, the invention provides an apparatus for transmitting a signal to a remote receiver, said apparatus comprising:

a signal transmitting unit including:

a) a first input for receiving a signal to be transmitted, said signal transmitting unit being operative to transmit said signal repetitively to create a succession of signal transmission events, each signal transmission event being spaced in time from a previous signal transmission event by a certain time interval characterized by a duration;

b) a second input for receiving d data element to control a duration of the time interval, said signal transmitting unit being responsive to the data element to set the time interval between two successive signal transmission events at a duration conveyed by the data element;

a time interval duration control module for successively generating different data elements and supplying the different data elements to said second input for varying said time interval to alter over time a rate or occurrence of the transmission events.

For the purpose of this specification, the expressions "random" and "substantially random" are used to define a numerical pattern with very low correlation between its composing elements.

In a most preferred embodiment of this invention, the apparatus for transmitting a signal uses transmission intervals of random duration between the signal transmission events. This apparatus is particularly useful for applications where the transmitting apparatus issues control signals directed toward a remotely located slave controller capable of locally implementing commands based on the signal transmission events. Such transmitting apparatus (also called "transmitter" in this specification) and slave controller combination are particularly useful to remotely control locomotives, such as those operating in switching yards. In such locomotive control systems the operator enters commands at the transmitter via a keyboard, keypad, voice or any other suitable human input means. The command is encoded, modulated and transmitted at random time intervals as an RF transmission. The receiver of the slave controller that is typically mounted aboard the locomotive receives and demodulates the RF signal originating from the transmitter, The received and demodulated signal is then processed so the desired action conveyed by the signal can be implemented.

Optionally, a repeater unit may be used in the signal transmission process. Once the transmitter issues the RF signal, a repeater unit receives it and processes it. Typical repeater units are ground-based stations whose function is to extend the radio frequency (RF) range of the transmitter of the remote control device by amplifying the signal and filtering noise components. Repeater units are well known in the art to which this invention pertains.

When the receiver of the slave controller picks-up the signal issued by the repeater (or directly from the transmitter) it first verifies its validity. This involves performing a sequence of operations to verify if the transmitter from which the signal transmission event originates is permitted to issue commands to the particular slave controller as well as verifying the integrity of the received signal. This involves comparing the tag of the transmitter embedded in the signal produced during each signal transmission event with a tag value stored in the memory of the slave controller. If both match, the receiver concludes that it has sensed a command signal from a transmitter that is specifically assigned to the slave controller. Note that the tag value stored in the memory of the slave controller may be dynamically changed. For example, a slave controller may be designed to respond to commands to a group of several transmitters, there being, however, a single transmitter that can issue commands at a given time. This feature can be used when human operators control a locomotive pulling a long consist. In such applications, an operator is assigned to each end of the consist and the operators may transfer control of the locomotive to one another. In such case, the tag value in the memory of the slave controller is dynamically changed each time the control is passed from one operator to another operator.

Preferably, the verification of the signal integrity is effected by using a check sum or other suitable error detection and/or correction algorithm.

If the signal passes both verification stages it is transferred to a logical processing module of the slave controller that may effect further validation steps and ultimately implement the command. Such further validation steps may include checking the command against the current operative status of the locomotive to determine if it can be implemented. This is usually effected to guard against operator error that may be requesting a command that is impossible or unsafe to carry out in certain circumstances.

In a preferred embodiment of this invention, the transmitter produces signal transmission events at substantially random time intervals. A time interval defines the time between two successive signal transmission events. The time intervals are randomly varied from one transmission event to another. One possible method of implementation is to provide the transmitter with a time interval duration control module that continuously outputs data elements, each data element designating directly or indirectly the duration of the time interval to be used. The data element is supplied to the signal transmitting unit that implements it.

The data element may be a signal of digital or analog nature or in any other form as long as it can convey information on the particular time interval to be used. Under the direct designation method, the signal contains the value of time interval to be implemented. The. signal transmitting unit therefore reads the signal and the information regarding the duration of the time interval is immediately available. The indirect designation method conveys a element of information that must be further processed by the signal transmitting unit to derive the duration of the time interval.

In a specific example, the data element can be a pointer in a data structure in the signal transmitting unit containing a pool of possible time intervals. The pointer serves as an indication of which one of the elements in the pool to use. In the most preferred embodiment of the invention, the time interval duration control module includes a generator of random time interval values. Those values are stored in a computer readable storage medium and may be organized in any suitable data structure. A circular buffer data structure is preferred. This buffer is used with a link or pointer indicating the next value to be used. Every time a signal transmission event occurs, the link or pointer is displaced to the next value in the circular buffer.

In a preferred embodiment, the time interval duration control module includes a multiplicative congruential random number generator with a period of $2^{32}$ is used to generate random numbers. Random number generators are available in standard compilers. For example, the programming language C has a random number generator rand ( ) which can be used to implement the random number generator of the invention. The use of a programming language other that C does not detract from the spirit of the invention. Similarly, any pseudo random number generator may be used here without detracting from the spirit of the invention.

In a typical interaction, the random number generator is first initialized using a seed value. Preferably, the seed value is selected such that it is unique Lo a particular transmitter. After the random number generator has been initialized, the pool (or set) of transmission intervals is created. Typically, an upper and lower interval value is determined in order to define a workable range and K random values are generated in between these upper and lower values.

In some critical applications requiring a high level of confidence the slave controller is designed to successfully receive at least one signal transmission from the transmitter within a pre-determined time-out interval. If this time-out interval elapses and no signal transmission has been received from the transmitter, the receiver defaults to a certain "safe" condition. For example, a slave controller aboard the locomotive will issue an "emergency brake on" instruction if it has failed to successfully receive a signal transmission from the transmitter within a time-out interval T.

When a time-out interval is used the set of K random values is generated taking into account the workable range and the time-out interval. Any value of K may be used without detracting from the spirit of the invention provided that K is selected such that the message is repeated a sufficient number of times during the time-out interval to allow the slave controller to successfully receive the message from the transmitter.

In a specific example, the value of K was determined experimentally by placing a selected number of transmitters in operation in a given frequency band. In order to satisfy the time-out constraint the sum of the K time intervals is computed, herein designated as the transmit period. If the transmit period is above the time-out period, the intervals are recomputed. Preferably an error margin is provided to allow a certain variation over the time-out period. In a preferred embodiment, the error margin is about 1% of the time-out period. For example, if the time out period is 5 seconds, then the sum of the intervals may be as high as 5.05 seconds. It may also be desirable to equalise the performance of the transmitters in the communication system such as to obtain substantially uniform response rates. In a preferred embodiment the performance of the communication system is normalised by constraining the transmit period within $\pm n\%$ of the time-out period. In a specific example, the time-out period is 5 seconds and an error margin of $\pm 1\%$ is permitted allowing the transmit period to lie between 4.95 seconds and 5.05 seconds. Therefore, if the transmit period lies outside of that range the transmission interval sequence is regenerated. However, if the transmit period lie within the constrain, the sequence of transmission intervals is assigned to the transmitter.

As embodied and broadly described herein, the invention also provides a remote control system comprising:

a transmitter for transmitting a signal indicative of an action to be performed remotely, said transmitter including:

a) a signal transmitting unit having:

i. a first input for receiving a signal to be transmitted, said signal transmitting unit being operative to transmit said signal repetitively to create a succession of signal transmission events, each signal transmission event being spaced in time from a previous signal transmission event by a certain time interval;

ii. a second input for receiving a data element to control a duration of the time interval, said signal transmitting unit being responsive to the data element to set the time interval between two successive signal transmission events at a duration conveyed by the data element;

b) a time interval duration control module for successively generating different data elements and supplying the different data elements to said second input for varying said time interval to alter over time a rate or occurrence of the transmission events;

a receiver for sensing said signal and for implementing locally an action in dependence upon a contents of the signal.

As embodied and broadly described herein, the invention also provides a method for transmitting a signal to a remote receiver by creating a succession of signal transmission events, each signal transmission event being spaced in time from a previous signal transmission event by a certain time interval characterized by a duration, said method comprising the steps of:

generating a signal to be transmitted, transmitting said signal successively to create the succession of signal transmission events at a rate that varies over time.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention for which reference should be made to the appending claims.

DESCRIPTION OF A PREFERRED EMBODIMENT

Figure 1:
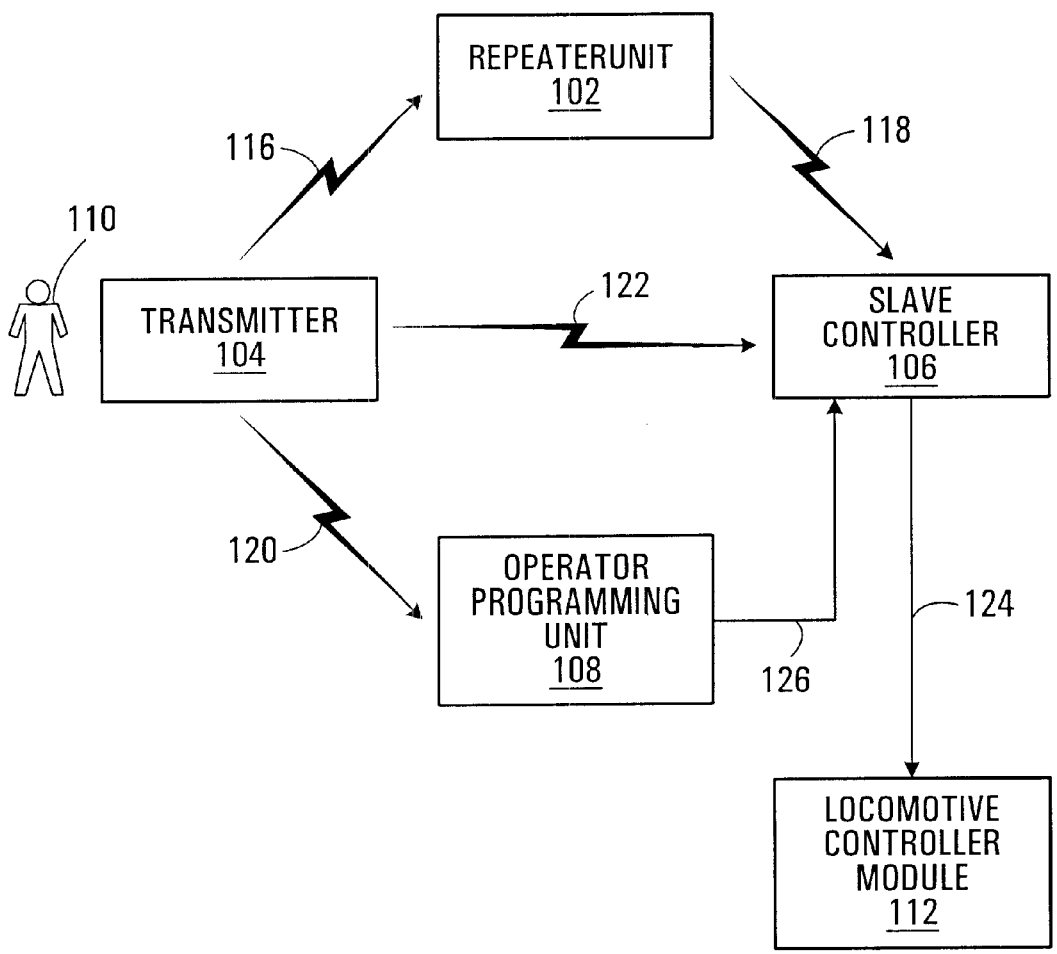
FIG. 1 is a simplified functional block diagram of a radio communication system embodying the principles of the invention.

In a most preferred embodiment of this invention, the transmitter using random transmission intervals is used in a radio control system such as can be used in locomotive control systems. As shown in FIG. 1, the radio control system 100 includes a set of functional units namely a portable transmitter 104 and a slave controller 106 mounted on board the locomotive. The transmitter has an interface allowing an operator 110 to enter commands. Typically, the interface includes a control panel with switches and levers allowing the operator 110 to remotely control the movement of the locomotive. Optionally, the radio control system may also include a repeater unit 102 to increase the range of the transmitter 104.

The transmitter 104 generates command signals over an RF link 122 (or 116 and 118 if the repeater unit 102 is involved) The slave controller 106 receives the commands and implements them. The implementation procedure consists of generating the proper control signals and interfacing those control signals with main controller module 112 provided in the locomotive to regulate the operation of the engine, braking system etc. The controller module 112 is part of the locomotive.

In the preferred embodiment, the radio control system 100 includes an operator-programming unit 108 to program certain functions of transmitter 104 and the slave controller 106. The programming operation between the operator-programming unit 108 and the slave controller 106 is effected over a communication channel 126. The programming operation between the operator-programming unit 108 and the transmitter 104 is effected over a communication channel 120. The communication channel 120 is a wireless infrared links.

The repeater unit 102 is a ground-based unit whose function is to extend the radio frequency (RF) range of the transmitter 104. In a specific example, the signal range is extended by amplifying the signal and filtering noise components. Repeater units are well-known in the art to which this invention pertains and typically comprise an RF antenna, an RF receiver, a decoder/encoder, an RF re-transmitter and any other equipment such as filters, duplexors and others required to receive a signal, process it and retransmit it. Preferably, the repeater unit re-transmits the signal at a frequency different and sufficiently spaced in frequency from the one used by the transmitter 104 such that the two signals can be resolved when the receiver unit 106 receives them.

In a specific example the radio frequencies used are between 806 MHz and 821 MHz (low band) or between 851 MHz and 866 MHz (High band) and frequencies are selected in pairs one from the low band and one from the high band. Any suitable frequency band may be used here without detracting from the spirit of the invention. The transmitter unit 104 operates at a frequency selected from the low band and the repeater unit 102 retransmits at a frequency selected from the high band. Examples of three frequency pairs are 1) 812.5375 MHz and 857.5375 MHz, 2) 812.7875 MHz and 857.7875 MHz, 3) 818.900 MHz and 863.900 MHz.

The slave controller 106 receives and demodulates the RF signal originating from the transmitter 104 or from the repeater unit 102. The signal is then decoded and the validity of the request is verified. The signal is first demodulated and the components of the message are extracted. In a specific example the message contains a command section, a transmitter identifier (or tag) section and a slave controller identifier section. These components are extracted from the message in a known manner. The validity verification on the message then follows. This is a two-step operation. First, the slave controller 106 determines if the transmitter 104 transmitting the message is permitted to issue commands to the slave controller. Second the signal integrity is verified. The first verification step involves a comparison between the tag extracted from the message and the value stored in the memory of the slave controller. In typical locomotive systems, a single transmitter can issue commands to a given locomotive. Generally, a memory in the slave controller stores an identifier indicative of the transmitter assigned to the locomotive. The identifier is compared to the tag extracted from the message. If both match, the slave controller concludes that the command is legitimate and proceeds with the remaining verification step. In the absence of a match, the slave controller rejects the message and takes no action.

During the second verification step, the signal integrity is assessed. The signal is processed by a check sum assessment algorithm or by any other suitable error detection/correction algorithm. If the slave controller 106 finds that the message is indeed intact then the command that it contains is carried into effect.

Figure 2:
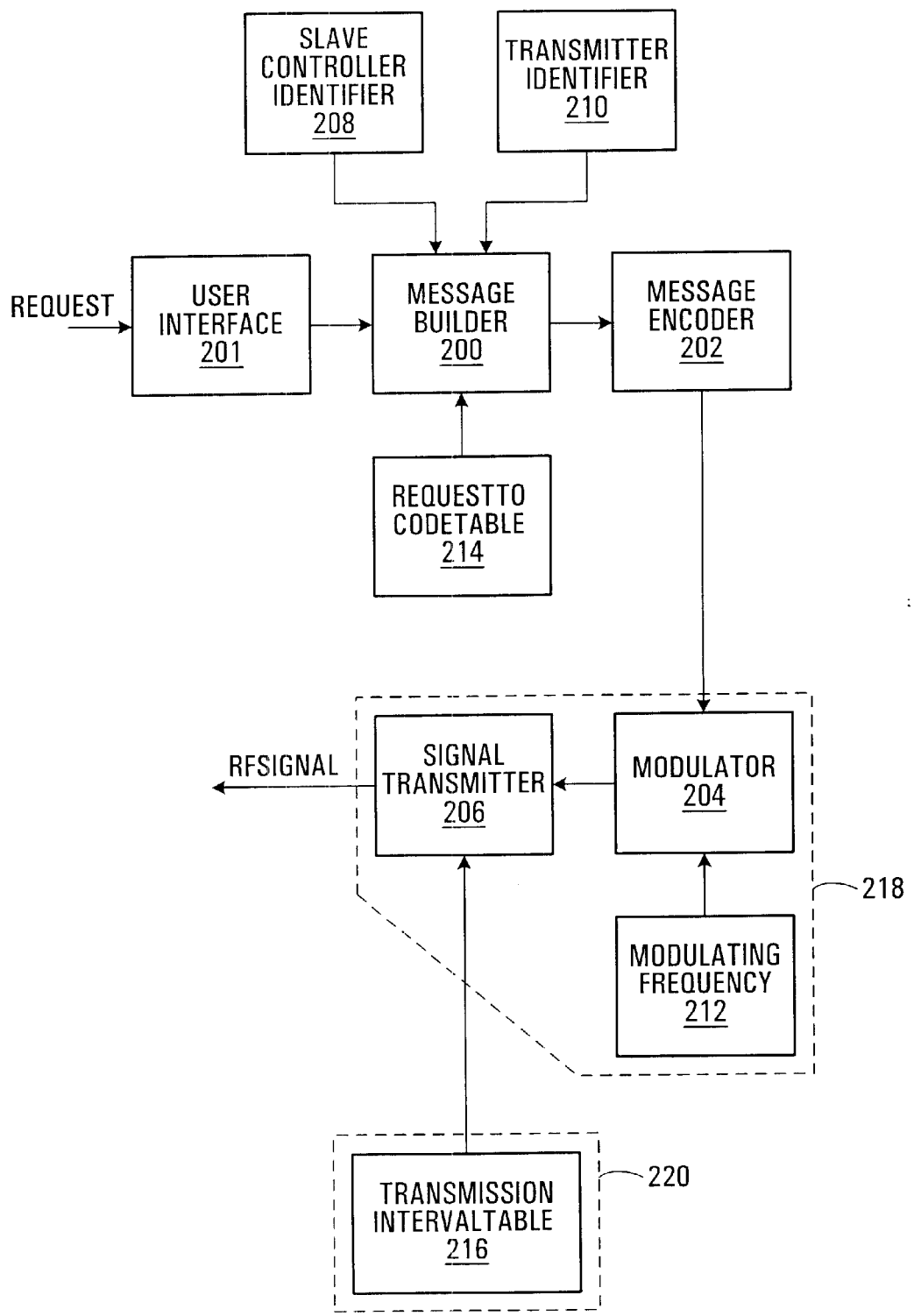
FIG. 2 is a functional block diagram of a transmitter in accordance with the invention.

The transmitter 104 of the radio control system is shown in more detail in FIG. 2. The transmitter 104 comprises a set of functional modules namely a user interface 201, a message builder unit 200, a message encoder 202, a signal transmitting unit 210 and a time interval duration control module 220. The signal transmission unit 218 includes a first input for receiving the signal to be transmitted. The signal is supplied to a modulator 204 that modulates the signal and transfers it to a signal transmitter 206 that effects the actual transmission. The modulator is coupled to a modulating frequency generator 212. The signal transmission unit 218 also includes a second input receiving data from the time interval duration control module 220. This data controls the time interval between two successive transmissions of the signal.

In a typical interaction, the user of the radio control system 110 enters via the user interface 201 a command to be executed by the locomotive. The user interface may be a keyboard, touch screen, speech recognition system or any other suitable input means. in a preferred embodiment, the user interface 201 comprises a set of buttons or levers for each of the allowable actions namely brake, accelerate, reverse and so on. Once the command has been entered the message builder unit 200 processes it. The message builder unit 200 assembles the received command with an identifier for the transmitter (also called tag) as well as for the slave controller. These two identifiers are stored in computer readable storage media 210 and 208. Such computer readable storage media are in the form of a read-only memory (ROM) or programmable read-only memory (PROM) modules. The command and the identifiers are digitally represented. Many message formats may be used here and the use of a particular message format does not detract from the spirit of the invention.

Optionally, once the message is created (the command including the identifiers) an encoding algorithm is applied by the message encoder 202 in order to reduce the occurrence of consecutive 0's or 1's in the message and therefore permit a self-synchronizing communication. Many encoding methods are known in the art of digital signal processing and the use of other encoding methods does not detract from the spirit of the invention.

Once the message has been created, the message is passed to the signal transmission unit 218, in particular to the modulator 204 that modulates the digital signal containing the message at the carrier frequency. In a preferred embodiment, the operator of the radio control unit may select the carrier frequency for the message. The carrier frequency generator 212 outputs the selected carrier frequency. Following the modulation of the signal, a signal transmitter module 206 transmits the signal at predetermined time intervals. The time interval control module controls the time interval between two successive signal transmission events.

The time intervals that the signal transmitting unit 218 uses are selected from a pool of possible values all stored on a computer readable storage medium 216 such as a ROM, PROM, disk or any other suitable machine readable storage means. The arrangement of the data may be a simple stored list, a table, a circular buffer or any other data structure suitable for the storage of a plurality of values. In a preferred embodiment, a circular buffer is used with a link or pointer indicating the next transmission interval value to be used. In another preferred embodiment, sequential memory locations in a buffer are used with a memory space containing the address of the next time interval, herein referred to as pointer. Every time a signal transmission even occurs, the link or pointer is displaced to the next transmission interval value in the data structure. Alternatively, the time interval values may be expressed as time periods. For example, five (5) time periods may be equal to 5 milliseconds if each period is equal to 1 millisecond. Therefore, the expression "time interval" must be given a wide interpretation and include not only time values but also multiples of time periods.

By transmitting signals sequentially at random time intervals an improved transmitter-receiver pair with substantially consistent response time can be obtained. The preferred embodiment of this invention makes use of equalized pseudo-random transmission intervals obtained using a random number generator. The use of these transmission intervals allows eliminating the requirement of having an operator manage the repetition rates of the transmitters in operation. The invention also provides communication systems operating concurrently with substantially uniform response times by constraining the values of the transmission intervals to lie within a given value. The invention also provides battery operated transmission units with substantially uniform battery life for identical batteries.

Figure 4:
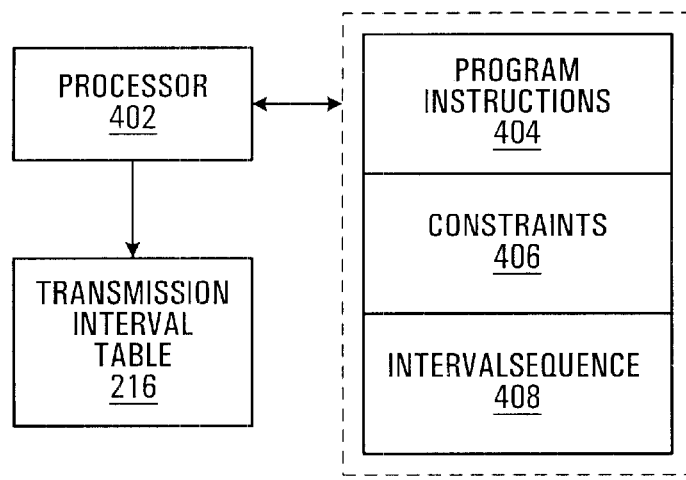
FIG. 4 is a block diagram of a time interval duration control module for generating transmission intervals, in accordance with the invention.

The operations to generate the time interval values sequence by the time interval duration control module 220 may be performed by a general-purpose digital computer using a CPU and memory means as shown in FIG. 4. Such computing platform typically includes a CPU 402 and a memory 400 connected to the CPU by a data communication bus. The memory 400 stores the data 406 and 408 and the instructions of the program 404 for generating the random or pseudo-random time interval values. That program 404 operates on the data 406, 408 in accordance with the algorithms described above to generate the transmission intervals based on a plurality of constraints. The time intervals are then loaded into the transmission interval table.

Figure 3:
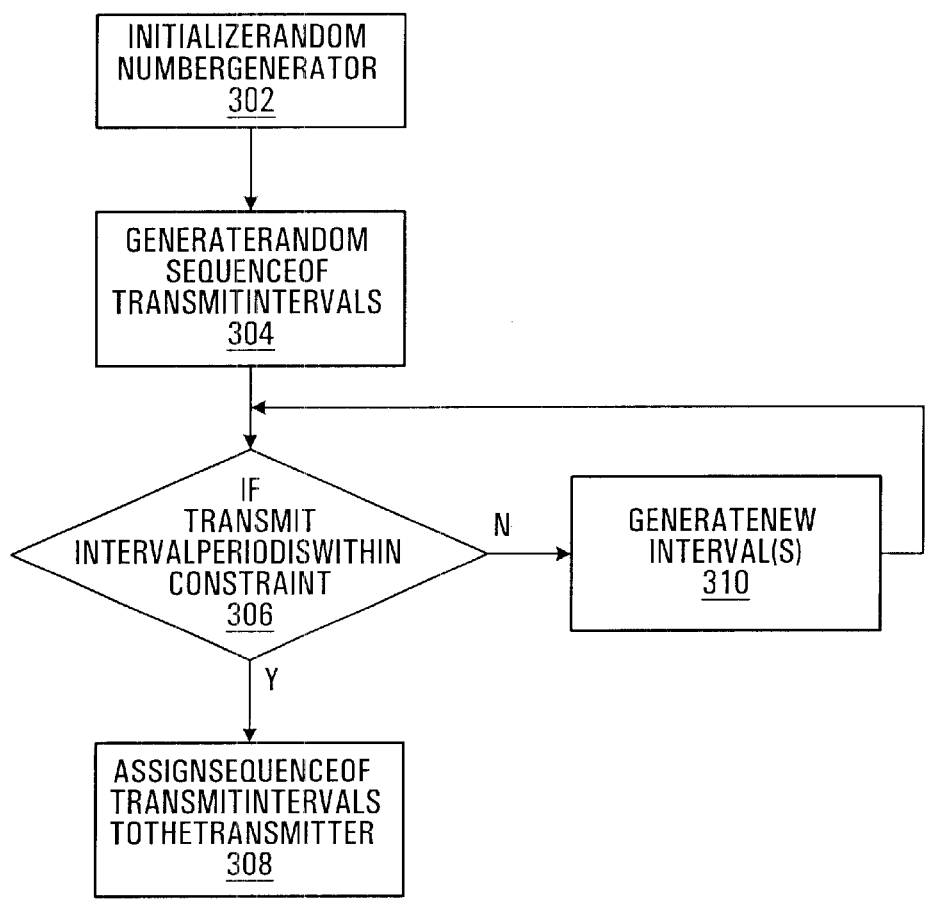
FIG. 3 is a flow chart of a method in accordance with the invention for assigning repetition rates to a transmitter unit.

In a preferred embodiment, the time intervals between successive transmissions are substantially random. As shown in FIG. 3, to generate the set of time intervals a random number generator is first initialized 302. Any pseudo-random number generator may be used here without detracting from the spirit of the invention. Random number generator algorithms are available in many standard compiler libraries. For example, the programming language C has a random number generator rand ( ) which can be used to implement the random number generator of the invention. The use of a programming language other that C does not detract from the spirit of the invention. In a preferred embodiment, a multiplicative congruential random number generator with a period of $2^{32}$ is used to generate random numbers. To initialize the random number generator a seed value is used. Preferably, a seed value is selected such that it is unique to the transmitter in order that each transmitter has a unique sequence of random numbers. Using a unique seed is preferable since a large number of random number generators will produce identical number sequences when initialized with the same seed. In a preferred embodiment the transmitter identifier is used to initialize the random number generator. In another preferred embodiment the serial number of the transmitter is used to initialize the random number generator. After the random number generator has been initialized, the set of transmission intervals is generated 304. Typically, an upper and lower interval value is determined in order to define a workable range of intervals. Random values are generated in between these upper and lower values. The workable range depends on a number of factors such as the number of transmitters in a frequency channel, the length of a message as well as the maximum time permitted between successful receptions of messages by the receiver module. In a preferred embodiment, the upper and lower values of the workable range are selected using heuristic rules. In a specific example, the desired operator observed response time of the control system is 1 second. In order to satisfy this requirement messages must be transmitted every 0.5 second interval. Therefore the lower boundary is about 500 milliseconds. The upper limit is set by setting a maximum of five transmissions per seconds yielding an upper boundary of about 200 milliseconds.

In addition, as described previously, slave controllers in systems requiring a high level of confidence must successfully receive messages within a pre-determined time-out interval otherwise, the receiver assumes a problem has occurred and a default emergency action is executed. For example, the slave controller aboard a locomotive will issue a "brake" instruction if it has failed to successfully receive a message from the transmitter unit within a time interval T. In d preferred embodiment the time interval T is 5 seconds. A set of K random transmission time interval values is generated taking into account the time interval T. Any value of K may be used without detracting from the spirit of the invention provided that K is selected such that the message is repeated a sufficient number of times during the time-out interval to allow with a high probability that the receiver module successfully receives the message from the transmitter. The degree of probability required depends on the performance requirements of the system and may vary. In a preferred embodiment, the value of K was determined experimentally. In another preferred embodiment is determined on the basis of the workable range and on the time-out interval. The following mathematical formula may be used to determine the value of K:

$$K = \text{Truncate}\left(\text{Time-out} \Big/ \frac{[\text{lower} + \text{upper}]}{2}\right)$$

Other means to compute the value of K may be used here without detracting from the spirit of the invention. In a specific example, the time-out interval T is 5 seconds, K is 16, the lower bound is 180 milliseconds and the upper bound is 450 milliseconds. The following instruction sequence may be used to generate the interval sequence:

For
i=0 to K−1
interval[i]=rand(lower, upper);
i=i+1;

Where interval[ ] is a buffer containing time interval values, rand(X,Y) is a random number generator function which generates substantially random values between the boundary values lower and upper and K is the size of the buffer interval[ ]. Other data structures and algorithms may be used here to generate random numbers without detracting from the spirit of the invention. Following this, in order to satisfy the time-out constraint the sum of the K time intervals computed, herein designated as the transmit period. If the transmit period is above the time-out period, condition 306 is answered in the negative and the intervals are recomputed. Preferably an error margin is provided to allow a certain variation over the time-out period. In a preferred embodiment, the error margin is about 1% of the time-out period. For example, if the time out period is 5 seconds, then the sum of the intervals may be as high as 5.05 seconds. It may also be desirable to equalise the performance of the transmitters in the communication system such as to obtain substantially uniform reception rates. This is done by normalizing the transmit interval period of all transmitters in a given locomotive control System to lie within a certain range. In a preferred embodiment the performance of the communication system is normalised by constraining the transmit period within ±n% of the time-out period. In a specific example, the time-out period is 5 and an error margin of ±1% is permitted allowing the transmit period to lie between 4.95 seconds and 5.05 seconds.

Therefore, when the transmit period lies outside of that range, so that the condition enquiry at step 306 is answered in the negative, one or more new interval values are then computed at step 310. That is, step 310 either replaces a single interval value with a new randomly generated value or, alternatively, step 310 replaces a set of interval values with a set of new randomly generated interval values. The system then proceeds back to the condition enquiry at step 306. On the other hand, when the transmit period lies within that range, the condition enquiry at step 306 is answered in the positive and the sequence of transmission intervals is assigned to the transmitter 308 and stored in a computer readable medium 216.

During the functioning of the transmitter, the time intervals are used to regulate the interval sequence as described above in the specification.

Most preferably, the functional blocks of the transmitter 104 depicted in FIG. 2 are implemented by software. The physical structure of the apparatus necessary for such implementation is depicted at FIG. 4. The program instructions for the software implemented functional blocks are stored in the memory portion 404. It should be understood that some of the functional blocks depicted in FIG. 4 cannot be implemented by software. More particularly, these are the user interface 201 and the signal transmitter 206. These functional blocks do not need to be described in great detail since their conception can easily be effected by a person skilled in the art.

As to the structure of the slave controller 106, the latter comprises a receiver section that senses the signal transmitted by the transmitter 206. In addition the slave controller includes a logical processing station to process the received signal and to generate the necessary control signals that are input to the locomotive controller module so the desired command can be implemented.

For more information on the structure of the slave controller 106 and also the structure of some components of the transmitter 104 the reader is invited to refer to consult publications and textbooks in the field of communication and control systems.

Although the present invention has been described in considerable detail with reference to certain preferred embodiments thereof, variations and refinements are possible without departing from the spirit of the invention as have been described throughout the document. Therefore, only the appended claims and their equivalents should limit the scope of the invention.

We claim:

1. An apparatus for transmitting a signal to a remote receiver, said apparatus comprising:
   a signal transmitting unit including:
   a) a first input for receiving a signal to be transmitted, said signal transmitting unit being operative to transmit said signal repetitively to create a succession of signal transmission events, each signal transmission event being spaced in time from a previous signal transmission event by a certain time interval characterized by a duration;
   b) a second input for receiving a data element to control a duration of the time interval, said signal transmitting unit being responsive to the data element to set the time interval between two successive signal transmission events at a duration conveyed by the data element;
   a time interval duration control module for successively generating different data elements and supplying the different data elements to said second input for varying said time interval to alter over time a rate or occurrence of the transmission events.

2. An apparatus as defined in claim 1, wherein the data elements generated by said time interval duration control module are selected to alter in a pseudo-random manner the rate of occurrence of the transmission events.

3. An apparatus as defined in claim 2, wherein the signal to be transmitted received at said first input is indicative of a command to be implemented at said remote receiver.

4. An apparatus as defined in claim 3, wherein the remote receiver is mounted in a locomotive and the signal to be transmitted received at said first input is indicative of an action to be effected by the locomotive.

5. An apparatus as defined in claim 2, wherein said time interval duration control module includes a data structure containing a plurality of data elements that can individually control the duration of a time interval between two successive transmission events.

6. An apparatus as defined in claim 5, wherein said time interval duration control module includes means for successively outputting from said data structure one data element that is supplied to said second input.

7. An apparatus as defined in claim 6, wherein said time interval duration control module includes a pointer indicating a data element in said data structure to output for application to said second input, and means to alter said pointer once the data element has been output, toward a new data element in said data structure to be output next.

8. An apparatus as defined in claim 7, wherein said data structure is a circular buffer.

9. An apparatus as defined in claim 5, wherein said time interval duration control module includes a pseudo-random number generator operative in generating a plurality of data elements for populating said data structure.

10. A remote control system comprising:
    a transmitter for transmitting a signal indicative of an action to be performed remotely, said transmitter including
    a) a signal transmitting unit having
       i) a first input for receiving a signal to be transmitted, said signal transmitting unit being operative to transmit said signal repetitively to create a succession of signal transmission events, each signal transmission being spaced in time from a previous signal transmission event by a certain time interval;

ii) a second input for receiving a data element to control a duration of the time interval, said signal transmitting unit being responsive to the data element to set the time interval between two successive signal transmission events at a duration conveyed by the data element;

b) a time interval duration control module for successively generating different data elements and supplying the different data elements to said second input for varying said time interval to alter over time a rate of occurrence of the transmission events;

receiver for sensing said signal and for implementing locally an action in dependence upon a content of the signal.

11. A remote control system as defined in claim 10, wherein the data elements generated by said time interval duration control module are selected to alter in a pseudo-random manner the rate of occurrence of the transmission events.

12. A remote control system as defined in claim 11, wherein the remote receiver is mounted in a locomotive and the signal to be transmitted received at said first input is indicative of an action to be effected by the locomotive.

13. A remote control system as defined in claim 12, wherein said time interval duration control module includes a data structure containing a plurality of data elements that can individually control the duration of a time interval between two successive transmission events.

14. A remote control system as defined in claim 13, wherein said time interval duration control module includes means for outputting from said data structure data elements that are supplied successively to said second input.

15. A remote control system as defined in claim 14, wherein said time interval duration control module includes a pointer indicating a data element in said data structure to output for application to said second input, and means to alter said pointer once the data element has been output, toward a new data element in said data structure to be output next.

16. A remote control system as defined in claim 15, wherein said data structure is a circular buffer.

17. A remote control system as defined in claim 13, wherein said time interval duration control module includes a pseudo-random number generator operative in generating a plurality of data elements for populating said data structure.

18. A method for transmitting a plurality of signals to a remote receiver, said method comprising the steps of:

transmitting signals to the remote receiver as a succession of respective signal transmission events, each respective signal transmission event being spaced in time from a previous signal transmission event by a certain time interval, said certain time interval having duration;

supplying a given signal to a transmitter; and transmitting said given signal repetitively within said succession of respective signal transmission events, so as to repeatedly transmit said given signal in a succession of repeated signal transmission events, said repeated signal transmission events being repeated at a rate that varies over time, each repeated signal transmission event being spaced in time from a previous repeated signal transmission event by a respective time interval, said respective time interval having a respective duration.

19. The method as defined in claim 18, comprising the step of altering the respective durations of the time intervals between respective successive repeated signal transmission events so as to alter the rate of occurrence of the repeated signal transmission events.

20. The method as defined in claim 19, wherein the durations of the time intervals are selected to alter in a pseudo-random manner the rate of occurrence of the transmission events.

21. The method as defined in claim 18, wherein the signal to be transmitted is indicative of a command to be implemented at the remote receiver.

22. The method as defined in claim 21, wherein the remote receiver is mounted in a locomotive and the signal to be transmitted is indicative of an action to be effected by the locomotive.

23. The method as defined in claim 19, wherein said method comprises selecting a data element from a plurality of data elements, each data element being indicative of a duration of a time interval between two successive transmission events.

24. The method as defined in claim 23, wherein said method comprises successively selecting data elements from the plurality of data elements.

25. Apparatus for transmitting a signal to a remote receiver, said apparatus comprising a signal transmitting unit including:

a) an input for receiving a signal to be transmitted;

b) a processing unit operative to transmit said signal repetitively to create a succession of signal transmission events, the signal transmission events in the succession of signal transmission events being spaced in time according to a certain pattern;

c) a second input for receiving data elements for controlling said certain pattern, said signal transmitting unit being responsive to the data elements to set the time interval between two successive signal transmission events at a duration conveyed by the data elements; and d) a time interval duration control module for successively generating data elements and supplying the different data elements to said second input for controlling the certain pattern.

26. The apparatus as defined in claim 25, wherein the signal to be transmitted received at said first input is indicative of a command to be implemented at said remote receiver.

27. The apparatus as defined in claim 26, wherein the remote receiver is mounted in a locomotive and the signal to be transmitted received at said first input is indicative of an action to be effected by the locomotive.

28. The apparatus as defined in claim 25, wherein said time interval duration control module includes a data structure containing a plurality of data elements that can individually control the duration of a time interval between two successive transmission events.

29. The apparatus as defined in claim 28, wherein said time interval duration control module includes means for successively outputting from said data structure one data element.

30. The apparatus as defined in claim 29, wherein said time interval duration control module includes a pseudo-random number generator operative in generating a plurality of data elements for populating said data structure.

31. A remote control system comprising in combination:

a first transmitter for transmitting a signal indicative of an action to be performed remotely, said first transmitter being operative to transmit said signal repetitively to create a succession of signal transmission events, the signal transmission events in the succession of signal transmission events being spaced in time according to a first transmission pattern;

a second transmitter for transmitting a signal indicative of an action to be performed remotely, said second transmitter being operative to transmit said signal repetitively to create a succession of signal transmission events, the signal transmission events in the succession of signal transmission events being spaced in time according to a second transmission pattern distinct from the first transmission pattern; and a receiver for sensing signals from either one of said first transmitter unit and said second transmitter unit and for implementing locally an action in dependence upon contents of the signals.

* * * * *